US006624104B2

(12) United States Patent
Sakoske et al.

(10) Patent No.: US 6,624,104 B2
(45) Date of Patent: Sep. 23, 2003

(54) HIGH DURABILITY LOW TEMPERATURE LEAD-FREE GLASS AND ENAMEL COMPOSITIONS WITH LOW BORON CONTENT

(75) Inventors: George E. Sakoske, Washington, PA (US); Gerhard Tünker, Offenbach Am Main (DE)

(73) Assignee: Ferro Glass & Color Corporation, Washington, PA (US)

( * ) Notice: Subject to any disclaimer, the term of this patent is extended or adjusted under 35 U.S.C. 154(b) by 0 days.

(21) Appl. No.: 09/916,302

(22) Filed: Jul. 30, 2001

(65) Prior Publication Data

US 2002/0004443 A1 Jan. 10, 2002

Related U.S. Application Data

(63) Continuation of application No. 09/418,480, filed on Oct. 15, 1999, now abandoned, which is a continuation-in-part of application No. 09/066,534, filed on Apr. 27, 1998, now abandoned.

(51) Int. Cl.[7] .......................... C03C 1/00; C03C 3/062; C03C 3/064; C03C 8/02; C03C 8/14
(52) U.S. Cl. ............................ 501/73; 501/14; 501/16; 501/17; 501/20; 501/21; 501/25; 501/32; 501/77
(58) Field of Search ................ 501/14, 16, 17, 501/20, 21, 25, 32, 73, 77, 58, 59, 65, 66, 68; 428/426, 428

(56) References Cited

U.S. PATENT DOCUMENTS

| 4,554,258 A | * | 11/1985 | Francel | 501/77 |
| 5,244,848 A | * | 9/1993 | Clifford et al. | 501/21 |
| 5,547,749 A | * | 8/1996 | Chiba et al. | 501/32 |
| 5,578,533 A | * | 11/1996 | Manabe et al. | 501/77 |
| 5,643,636 A | * | 7/1997 | Usui et al. | 501/77 |
| 5,714,420 A | * | 2/1998 | Sakoske et al. | 501/10 |

FOREIGN PATENT DOCUMENTS

| EP | 0 370 683 | * | 5/1990 |
| EP | 0 782 974 | * | 7/1997 |
| EP | 0 854 120 | * | 7/1998 |
| EP | 0 895 969 | * | 2/1999 |
| GB | 834382 | * | 5/1960 |
| JP | 06-234547 | * | 8/1994 |
| JP | 09-227214 | * | 2/1997 |

OTHER PUBLICATIONS

Watanabe et al., Yogyo–Kyokai–Shi, 78[5] 1970, "Properties of $SiO_2$—$Bi_2O_3$—$Na_2O$ Glass".*

* cited by examiner

*Primary Examiner*—Michael Marcheschi
(74) *Attorney, Agent, or Firm*—Rankin, Hill, Porter & Clark LLP

(57) ABSTRACT

Low temperature melting lead-free glass and enamel compositions are provided which have low boron content and possess high durability properties. Enamel pastes containing frits of the glass compositions are particularly useful in forming colored borders in automotive glass.

10 Claims, No Drawings

HIGH DURABILITY LOW TEMPERATURE LEAD-FREE GLASS AND ENAMEL COMPOSITIONS WITH LOW BORON CONTENT

This application is a continuation of application Ser. No. 09/418,480 Abn, filed Oct. 15, 1999, which is a continuation-in-part of application Ser. No. 09/066,534 Abn filed Apr. 27, 1998.

This invention relates to low temperature melting lead-free glass and enamel compositions which have low boron content and possess high durability properties.

BACKGROUND OF THE INVENTION

Lead-free glass compositions are known in the art. As illustrative there can be mentioned the following:

Reinherz U.S. Pat. No. 4,892,847
Francel U.S. Pat. No. 4,554,258
Roberts U.S. Pat. No. 5,252,521
Klimas U.S. Pat. No. 4,970,178
Clifford U.S. Pat. No. 5,308,803
Murkens U.S. Pat. No. 5,093,285
Ryan U.S. Pat. No. 5,559,059
Newman U.K. Patent No. 2,301,100
Prunchak U.S. Pat. No. 5,629,247

Additional disclosures of lead-free glass compositions may be found in Francel et al., U.S. Pat. No. 4,446,241, Francel et al., U.S. Pat. No. 4,537,862, Reade, U.S. Pat. No. 4,224,074, Eppler, U.S. Pat. No. 4,312,951, Eppler, U.S. Pat. No. 4,376,169, Emlemdi, U.S. Pat. No. 5,504,045, Manabe et al., U.S. Pat. No. 5,578,533 and Evans et al., International Application No. PCT/EP94/00403.

Also, attention is directed to my prior filed application U.S. Ser. No. 08/908,953 Abr, filed Aug. 8, 1997 and my copending application Ser. No. 09/066,533 Abr, filed Apr. 27, 1998, entitled LEAD-FREE GLASS AND ENAMEL COMPOSITIONS WITH HIGH BISMUTH OXIDE CONTENT.

These glass compositions are generally used to form, in a well known manner, glass frits which are, in turn, used to formulate glass enamel compositions. These glass (or ceramic) enamel compositions are known to be useful for forming decorative coatings for glassware, chinaware, architectural glass and the like. They are especially useful in forming colored borders around glass sheets used for automotive windshields, sidelights and backlights. These colored borders enhance the appearance as well as prevent UV degradation of underlying adhesives.

In general, these enamel compositions consist essentially of a glass frit, a colorant and an organic vehicle. They are applied to a desired substrate and subsequently fired to burn off the organic vehicle and fuse the frit, thus bonding the enamel coating to the substrate.

Glass sheets for automotive use are generally coated with the ceramic enamel composition and then subjected to a forming process at elevated temperatures. During this treatment the enamel melts and fuses to the glass substrate and the glass is formed into a desired final shape. However, many prior art coatings exhibit a tendency to adhere to the materials covering the forming die, such as a fiberglass or metal fiber covered die, because these conventional enamels have a low viscosity after melting and stick to other materials at high temperature. Accordingly, these materials are not suitable for use in glass forming processes in which the heated glass coated with enamel contacts a material-covered forming die.

Various approaches have been suggested in order to facilitate the forming of glass sheets with a ceramic enamel coated thereon, withstanding of the elevated bending or forming temperatures, and repeated contact of the glass sheet and the covered forming die without the enamel adhering to the forming die. For example, U.S. Pat. Nos. 4,596,590 and 4,770,685 (issued to Boaz) and EP 201241 propose the addition of a low valent metal oxide powder, e.g., cuprous oxide, to the paint composition to provide a non-stick barrier between the coating and the fiberglass-covered forming die. U.S. Pat. Nos. 4,684,389; 4,857,096 and 5,037,783 (issued to Boaz), propose adding finely divided zinc metal powder for a similar effect. The use of an iron metal powder is proposed in U.S. Pat. No. 4,983,196 (issued to Stotka).

The use of other metal oxide powders, including bismuth oxide-containing formulations have been proposed in U.S. Pat. Nos. 4,029,605 (issued to Kosiorek); 4,098,949 (issued to Kosiorek); 4,892,847 (issued to Reinherz); 4,959,090 (issued to Reinherz); 4,970,178 (issued to Klimas et al.); 5,093,285 (issued to Murkens); 5,203,902 (issued to Murkens) and EP 370,693.

However, certain of the bismuth containing systems produce a weak glass, such as when lithium is present, and have poor silver bleed-through properties, as well as inadequate anti-stick properties.

U.S. Pat. No. 4,828,596 proposes introducing copper sulfide or copper sulfate into the ceramic enamel composition as an anti-stick agent. Sulfides or sulfates of other metals have been proposed as anti-stick agents in U.S. Pat. No. 4,8922,396 (issued to Reinherz).

A purportedly improved anti-stick ceramic enamel composition is proposed by U.S. Pat. Nos. 5,153,150 and 5,208,191 (issued to Ruderer et al.) wherein a seed powder containing $Zn_2SiO_4$ is introduced into an oxide composition with or without the presence of bismuth oxide.

As a further problem, a number of previous ceramic enamel systems employ a lead-containing glass frit. For environmental considerations it is desirable to avoid the use of any lead-containing system.

Also, while some of the above-mentioned enamel systems may perform fairly well in conventional glass forming processes, some are not satisfactory for use in the newly-developed "deep bend" processes for forming automotive glass.

It is essential that the enamel compositions also possess adequate resistance to certain chemical agents, which they may contact, and many of the prior art compositions fail in this respect.

Each of the previously known enamel composition suffers from one or more of the deficiencies noted above, making it desirable to provide a composition which avoids these shortcomings. The present invention provides such ceramic enamel compositions, a method for employing the compositions, and substrates coated therewith.

The present invention provides a glass composition and glass frit produced therefrom which can be used in producing enamels having improved chemical durability properties to the fused enamel coating. Currently, the only lead-free glass frits suitable for automotive enamel use which pass sulfuric acid durability test specification required, for example, in Japan, use lithium ions. If not carefully controlled, however, the use of lithium can cause undesirable stresses and substrate breakage. The novel glass compositions of this invention avoid this problem. These compositions also impart excellent anti-stick properties.

DESCRIPTION OF THE INVENTION

The present invention provides new glass compositions from which can be obtained bismuth borosilicate-containing glass frits which have a lower boron oxide content. These systems do not require the use of zirconium oxide, titanium oxide or lithium oxide within the composition range.

The glass compositions of the present invention are as follows:

| Oxide Component | Broad Range (wt %) | Preferred Range (wt %) | More Preferred Range (wt %) |
|---|---|---|---|
| $Bi_2O_3$ | 40–70 | 50–65 | 54–63 |
| $SiO_2$ | 25–40 | 28–38 | 29–37 |
| $B_2O_3$ | 0–3 | 0–2.8 | 1–2.7 |
| $Al_2O_3$ | 0–5 | 0–3 | 0.3–1.0 |
| $TiO_2$ | 0–4 | 0–3 | 1–2 |
| $Na_2O$ | 0–8 | 1–6 | 3–4.5 |
| $K_2O$ | 0–5 | 0–1.5 | 0–1 |
| $Li_2O$ | 0–4 | 0–1 | 0 |
| $F^{-1}$ | 0–4 | 0–2 | 0 |

Particularly suitable are compositions in which the $B_2O_3$ content is not greater than 2 wt. %.

The glass compositions are formed in a known manner as, for example, blending the known starting materials and melting at a temperature of about 1000° to 1300° C. for about forty (40) minutes to form a molten glass having the desired composition. The molten glass formed can then be suddenly cooled, e.g., water quenched, in a known manner to form a frit. The frit can then be ground using conventional milling techniques to a fine particle size, preferably between 2 to 6 microns.

The invention also provides glass (ceramic) enamel compositions employing the above-described glass frit compositions. These compositions comprise from about 30 to 95 wt. % solids of a glass frit component.

This component comprises the disclosed glass frit compositions.

This glass frit component can be a single composition of the invention or, alternatively, can be a mixture of these frits. Also, at least one frit of the present invention may be combined with an additional low melting frit having a composition outside the scope of those of the invention to the extent that this other frit does not deteriorate the qualities of the enamel which results.

Representative of such other frit that can be employed is one having a composition shown below:

| Oxide | Weight % Range |
|---|---|
| $SiO_2$ | 20–35 |
| $Bi_2O_3$ | 10–50 |
| ZnO | 5–45 |
| $B_2O_3$ | 5–15 |
| $Na_2O$ | 1–7 |
| CaO | 0–10 |
| $TiO_2$ | 0–2 |
| $Al_2O_3$ | 0–5 |
| $ZrO_2$ | 0–2 |
| $F_2$ | 0–1 |

A method of making such a frit is disclosed in U.S. Pat. No. 5,346,651. These frits have a sufficiently low firing temperature to ensure adequate adhesion to the substrate and also possess low density characteristics.

The finely ground glass frit can be combined with a mixed metal oxide pigment, any other type of metal powder, metal resonate, or other material of choice. Typical mixed metal oxide pigments used to produce black colors in the automotive industry would include oxides of copper, chrome, iron, cobalt, nickel, manganese, and the like. Although these black spinel pigments are preferred for use in the automotive industry, other metal oxide pigments to produce other various colors, may be combined with the glass frit compositions in this invention. Other end uses could include, and are not limited to, the architectural, appliance, and beverage industries. The pigment component would generally comprise from 5 to 40% by weight of the glass frit, depending upon the range of color, gloss, and opacity desired.

Pigments for use are known in the art and are commercially available. Examples are those such as $CuCr_2O_4$, $(Co,Fe)(Fe,Cr)_2O_4$ and the like. Illustrative are pigments available from Cerdec Corporation as *2991 pigment which is a copper chromite black pigment, *2980 pigment which is a cobalt chromium iron black pigment and *2987 pigment which is a nickel manganese iron chromium black pigment.

The enamel compositions of the invention may also contain up to about 15 wt % solids of a commonly used filler such as silica and alumina, and other conventional additives, such as iron, silicon, zinc and the like to enhance desired properties, such as resistance to silver bleed-through. The filler may also be a refractory oxide filler such as wollastonite and materials such as alumina-silicate materials, calcium silicate compounds, boron alumina-silicate compounds, soda-calcia-alumina-silicate compounds, feldspar compounds, titania and combinations of such oxides.

The enamel compositions may also contain up to about 20 wt % solids of a crystalline seed material such as bismuth silicate which is disclosed in my copending U.S. patent application Ser. No. 08/569,905, filed Dec. 8, 1995, which is incorporated herein by reference. The bismuth silicate seed materials include, but are not limited to, $Bi_{12}SiO_{20}$, $Bi_4(SiO_4)_3$ and $Bi_2SiO_5$.

The enamel compositions are combined with an organic vehicle to form a printable enamel paste.

The enamel paste in general will contain from about 85 to about 60 wt % solids as above described and about 15 to about 40 wt % of the suitable organic vehicle. The viscosity of the paste is adjusted so that it can be screen printed, roll coated or sprayed onto the desired substrate.

The vehicle to be employed in the paste is selected on the basis of its end use application. It is essential that the vehicle adequately suspend the particulates and burn off completely upon firing of the paste on the substrate. Vehicles are typically organic and include compositions based on pine oils, vegetable oils, mineral oils, low molecular weight petroleum fractions, tridecyl alcohols, synthetic and natural resins, and the like. Surfactants and/or other film forming modifiers can also be included.

Correspondingly, UV-base vehicles are equally applicable for use in the invention. Such UV-base vehicles are well known in the art and are generally composed of polymerizable monomers and/or oligomers containing, for example, acrylate or methacrylate functional groups, together with photoinitiators and polymerization inhibitors. Representative systems are disclosed in U.S. Pat. Nos. 4,306,012 and 4,649,062. As is recognized, such systems are cured with ultraviolet radiation after application to the substrate.

The specific vehicle and amounts employed are selected based upon the specific components of the paste and the desired viscosity. In general, the amount of the vehicle is about 15 to about 40% by weight based upon the total weight of the enamel paste.

In general, the enamel pastes are viscous in nature, with the viscosity depending upon the application method to be employed and end use. For purposes of screen-printing, viscosities ranging from 10,000 to 80,000 and preferably 35,000 to 65,000 centipoises at 20° C., as determined on a Brookfield Viscometer, #7 spindle at 20 rpm, are appropriate.

The invention also provides a substrate having fired thereon an enamel paste of the invention. Such substrates are illustrated by glass, ceramic or other non-porous substrates and particularly an automotive glass substrate. Other substrates include architectural glass, appliances and beverage containers.

Frits within the disclosed composition range which are resistant to crystallization are particularly suitable, combined with pigment, to form enamel compositions which form clear color compositions for use with architectural glass substrates.

To prepare the enamel compositions of the invention, the necessary frit or frits are ground to a fine powder using conventional methods. The frit component is then combined with the other solids components. The solids are then mixed with the necessary vehicle to form the enamel paste. The viscosity is adjusted as desired.

Once the enamel paste is prepared, it can be applied to the substrate in a conventional manner such as by screen printing, decal application, spraying, brushing, roller coating or the like. Screen printing is preferred when the paste is applied to a glass substrate. After application of the paste to a substrate in a desired pattern, the applied coating is then fired to bond the enamel to the substrate. The firing temperature is generally determined by the frit maturing temperature, and preferably is in a broad temperature range. Typically, the firing range for an instant composition is in the range of about 500° to 750° C., more preferably in the range of about 520° to 650° C. and most preferably about 530 to 620° C.

EXAMPLES

Low melting glass frit compositions are produced by mixing together raw materials which are known to the art, and using methods known to those skilled in the art. The well mixed raw batch compositions are then melted at temperatures between 1000 to 1300° C., followed by sudden cooling, again using methods known to those skilled in the art. The glass compositions are then ground to a fine particle size, preferably between 2 to 6 microns using a ball mill. The finely ground powder frits are then used to form glass enamel compositions.

The finely ground glass frit is combined with a mixed metal oxide pigment.

Further, the solids of the enamel compositions are dispersed and suspended in a vehicle selected for the end use application to form the enamel paste.

Testing is performed by combining the glass frit or enamel composition with a pine oil based vehicle screen printing the resulting frit or enamel paste on to a microscope slide or automotive glass substrate. The slides or automotive glass substrate are then fired at various temperatures to determine the "firing temperature", FT, or "minimum firing temperature" MF. The FT is the temperature where the glass has sufficient time to flow and fuse within a 15 minute fire and yield a glossy smooth surface. The MF is the temperature where the enamel has sufficient time to flow and fuse in a 4 minute fire and yield an enamel without interconnected porosity. Preheat time is 10 and 6 minutes at 427° C. for FT and MF respectively.

Acid resistance is evaluated using ASTM C-724-91 using a 10% by weight solution of citric acid. Fired trials are exposed to the solution for 15 minutes and rated based upon the following:

Grade 1—No apparent attack
Grade 2—Appearance of iridescence or visible stain on the exposed surface when viewed at an angle of 45°, but not apparent when viewed at angles less than 30°.
Grade 3—A definite stain which does not blur reflected images and is visible at angles less than 30°.
Grade 4—Definite stain with a gross color change or strongly iridescent surface visible at angles less than 30° and which may blur reflected images.
Grade 5—Surface dull or matte with chalking possible.
Grade 6—Significant removal of enamel with pinholing evident.
Grade 7—Complete removal of enamel in exposed area.

Glass Frit Formulation (weight %)

| Component | Example 1 | Example 2 | Example 3 | Example 4 | Example 5 |
| --- | --- | --- | --- | --- | --- |
| $Bi_2O_3$ | 67.77 | 58.29 | 61.06 | 58.22 | 54.24 |
| $SiO_2$ | 28.17 | 36.34 | 32.39 | 34.07 | 38.08 |
| $B_2O_3$ | 0 | 0 | 1.60 | 2.99 | 1.96 |
| $Al_2O_3$ | 0.23 | 0.20 | 0.24 | 0.23 | 0.29 |
| $TiO_2$ | 1.09 | 0.94 | 1.15 | 1.09 | 1.69 |
| $Na_2O$ | 2.02 | 3.56 | 3.56 | 3.40 | 3.74 |
| $K_2O$ | 0.71 | 0.67 | 0 | 0 | 0 |
| Fire Temp. (° C.) | 560 | 582 | 568 | 571 | 582 |
| Acid Resistance ASTM C-724-91 | 1 | 1 | 1 | 1 | 1 |

Following are black automotive enamel formulations, made with the frit examples given above.

Black Enamel Formulation (weight %)

| Component | Example 6 | Example 7 | Example 8 | Example 9 | Example 10 |
| --- | --- | --- | --- | --- | --- |
| Frit-Example 2 | 80.0 | | | | |
| Frit-Example 3 | | 80.0 | 79.0 | | |
| Frit-Example 4 | | | | 79.0 | |
| Frit-Example 5 | | | | | 80.0 |
| *2980 | 20.0 | 20.0 | 20.0 | 20.0 | 20.0 |
| RD-2077 | | | 1.0 | 1.0 | |
| Min. Fire (° C.) | 632 | 610 | 621 | 621 | 627 |
| Acid Resistance ASTM C-724-91 | 1 | 1 | 1 | 1 | 1 |
| Anti-stick Properties | | | Good | Good | |

*2980 is an iron cobalt chrome pigment and RD-2077 is a bismuth silicate material. Both materials are commercially available at Cerdec Corporation, Drakenfeld Products, West Wylie Avenue, Washington, Pennsylvania. Anti-stick properties are evaluated by printing the enamels on a 4" × 4" piece of automotive glass substrate, firing in a 3 to 5 minute automotive type firing cycle, and pressing with a pad of commercially used material, while the hot enamel and substrate remain inside the furnace.

Additional Examples of Boron-free frits are as follows:

Glass Frit Formulation (weight %)

| Component | Example 11 | Example 12 | Example 13 | Example 14 |
| --- | --- | --- | --- | --- |
| $Bi_2O_3$ | 60 | 56 | 60 | 59.7 |
| $SiO_2$ | 35 | 36.3 | 33 | 32.5 |
| $Na_2O$ | 5 | 7.4 | 7 | 2.5 |

-continued

Glass Frit Formulation (weight %)

| Component | Example 11 | Example 12 | Example 13 | Example 14 |
|---|---|---|---|---|
| $Al_2O_3$ | — | 0.2 | — | — |
| $K_2O$ | — | — | — | 3.8 |
| $F_2$ | — | — | — | 1.5 |
| $T_G$ °C.* | 482 | 475 | 450 | 434 |
| $T_S$ °C.** | 573 | 563 | ca. 540 | 532 |
| Acid*** Resistance | 1 | 1 | 2 | 2 |

*Glass transformation point measured by the Differential Scanning Colorimetry (DSC) method.
**Softening point determined by the DSC method.
***Determined against 3% by weight HCl for 2 hours at room temperature. Scale: 1 = no effect, 2 = weak effect, 3 = matte, 4 = abrades easily, 5 = dissolved.

These frits can be employed in producing enamel formulations in the same manner as the frits of Examples 1–5 above.

What is claimed is:

1. An enamel coating formed by firing a glass composition consisting essentially of:

| | |
|---|---|
| $Bi_2O_3$ | 54–63 wt % |
| $SiO_2$ | 28–38 wt % |
| $B_2O_3$ | 0–2 wt % |
| $Al_2O_3$ | 0–3 wt % |
| $TiO_2$ | 0–2 wt % |
| $Na_2O$ | 0–4.5 wt % |
| $K_2O$ | 0–1.5 wt % |
| $Li_2O$ | 0–1 wt % |
| $F^{-1}$ | 0–1 wt %. |

2. The enamel coating according to claim 1, wherein the glass composition consists essentially of:

| | |
|---|---|
| $Bi_2O_3$ | 54–63 wt % |
| $SiO_2$ | 29–37 wt % |
| $B_2O_3$ | 1–2 wt % |
| $Al_2O_3$ | 0.3–1.0 wt % |
| $TiO_2$ | 1–2 wt % |
| $Na_2O$ | 3–4.5 wt % |
| $K_2O$ | 0–1 wt % |
| $Li_2O$ | 0 wt % |
| $F^{-1}$ | 0 wt %. |

3. In a glass enamel paste which comprises a glass frit component, an oxide pigment component and an organic vehicle, wherein the glass frit component comprises at least one glass frit produced from a glass composition which consists essentially of:

| | |
|---|---|
| $Bi_2O_3$ | 54–63 wt % |
| $SiO_2$ | 28–38 wt % |
| $B_2O_3$ | 0–2 wt % |
| $Al_2O_3$ | 0–3 wt % |
| $TiO_2$ | 0–2 wt % |
| $Na_2O$ | 0–4.5 wt % |
| $K_2O$ | 0–1.5 wt % |
| $Li_2O$ | 0–1 wt % |
| $F^{-1}$ | 0–2 wt %. |

4. The glass enamel paste according to claim 3, wherein the glass composition consists essentially of:

| | |
|---|---|
| $Bi_2O_3$ | 54–63 wt % |
| $SiO_2$ | 29–37 wt % |
| $B_2O_3$ | 1–2 wt % |
| $Al_2O_3$ | 0.2–1.0 wt % |
| $TiO_2$ | 1–2 wt % |
| $Na_2O$ | 3–4.5 wt % |
| $K_2O$ | 0–1 wt % |
| $Li_2O$ | 0 wt % |
| $F^{-1}$ | 0 wt %. |

5. The glass enamel paste according to claim 3 wherein the glass composition consists essentially of:

| | |
|---|---|
| $Bi_2O_3$ | 58.29 wt % |
| $SiO_2$ | 36.34 wt % |
| $B_2O_3$ | 0 wt % |
| $Al_2O_3$ | 0.20 wt % |
| $TiO_2$ | 0.94 wt % |
| $Na_2O$ | 3.56 wt % |
| $K_2O$ | 0.67 wt % |
| $Li_2O$ | 0 wt % |
| $F^{-1}$ | 0 wt %. |

6. The glass enamel paste according to claim 3, wherein the glass enamel paste has a solids content comprising the glass frit component and the oxide pigment component, and wherein the solids content is from about 60% to about 85% by weight of the glass enamel paste.

7. The glass enamel paste according to claim 3 wherein the glass frit component also contains one or more other low temperature melting glass frits having a temperature of about 1000° C. to 1300° C.

8. The glass enamel paste according to claim 3, further comprising up to about 20% by weight of solids of a crystalline seed material.

9. The glass enamel paste according to claim 8 wherein the crystalline seed material is bismuth silicate.

10. In a glass enamel paste which comprises a glass frit component, an oxide pigment component and an organic vehicle, wherein the glass frit component comprises at least one glass frit produced from a glass composition which consists essentially of:

| | |
|---|---|
| $Bi_2O_3$ | 54.24 wt % |
| $SiO_2$ | 38.08 wt % |
| $B_2O_3$ | 1.96 wt % |
| $Al_2O_3$ | 0.29 wt % |
| $TiO_2$ | 1.69 wt % |
| $Na_2O$ | 3.74 wt % |
| $K_2O$ | 0 wt % |
| $Li_2O$ | 0 wt % |
| $F^{-1}$ | 0 wt %. |

* * * * *